United States Patent
Amano et al.

(10) Patent No.: US 8,102,273 B2
(45) Date of Patent: Jan. 24, 2012

(54) GUIDANCE SYSTEM BY DETECTING TAPPED LOCATION

(75) Inventors: Tomio Amano, Yokohama (JP); Kimitake Hobo, Tokyo (JP); Makoto Kobayashi, Tokyo (JP); Ai Okada, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 12/334,504

(22) Filed: Dec. 14, 2008

(65) Prior Publication Data

US 2010/0148980 A1 Jun. 17, 2010

(51) Int. Cl.
*G08B 21/00* (2006.01)

(52) U.S. Cl. ........... 340/686.6; 340/686.4; 340/686.1; 340/686.5; 340/540; 439/489

(58) Field of Classification Search .......... 340/540, 340/686; 439/315, 488–491; 710/63
See application file for complete search history.

(56) References Cited

U.S. PATENT DOCUMENTS

| | | | |
|---|---|---|---|
| 7,898,397 B2* | 3/2011 | Kerr et al. | 340/407.2 |
| 2002/0167699 A1* | 11/2002 | Verplaetse et al. | 359/158 |
| 2004/0219824 A1* | 11/2004 | Conn | 439/490 |
| 2006/0097983 A1* | 5/2006 | Haggman et al. | 345/156 |
| 2006/0192763 A1 | 8/2006 | Ziemkowski | |
| 2008/0150905 A1* | 6/2008 | Grivna et al. | 345/173 |
| 2009/0073128 A1* | 3/2009 | Marsden | 345/168 |

FOREIGN PATENT DOCUMENTS

| | | | |
|---|---|---|---|
| JP | 60181813 A1 | 9/1985 |
| JP | 07334185 A1 | 12/1995 |
| JP | 10177448 A1 | 6/1998 |

* cited by examiner

*Primary Examiner* — Jennifer Mehmood
*Assistant Examiner* — Mark Rushing
(74) *Attorney, Agent, or Firm* — Schmeiser, Olsen & Watts; John Pivnichny

(57) ABSTRACT

A method for guiding a user to connect a peripheral component to a unit of electronic equipment includes the user tapping upon one of a plurality of connector interfaces comprising the unit of electronic equipment. In response to the tapping, the one tapped connector interface is identified and the user is notified of the identity of the one tapped connector interface. The identifying includes detecting the tapping at two or more sensors and processing signals generated by the sensors to detect the one tapped connector interface. The notifying includes articulating an identity of the one tapped connector interface using a voice synthesizer and loudspeaker.

21 Claims, 6 Drawing Sheets

| REGION ID | SENSOR 1 | | | SENSOR 2 | | | SENSOR 3 | | |
|---|---|---|---|---|---|---|---|---|---|
| | AMPLITUDE | DAMPING FACTOR | DELAY | AMPLITUDE | DAMPING FACTOR | DELAY | AMPLITUDE | DAMPING FACTOR | DELAY |
| 1 | 10 | 90% | 0 | 9.5 | 55% | 0.7 | 9.5 | 55% | 0.7 |
| 2 | 8 | 67% | 0.5 | 7.5 | 75% | 0.5 | 7.5 | 75% | 0.5 |
| 3 | 9 | 45% | 0.7 | 9.8 | 95% | 0 | 9.8 | 95% | 0 |
| 4 | .. | .. | .. | .. | .. | .. | .. | .. | .. |
| 5 | | | | | | | | | |
| .. | | | | | | | | | |

FIG. 6

GUIDANCE SYSTEM BY DETECTING TAPPED LOCATION

BACKGROUND

The present invention is directed to connecting peripheral components to electronic equipment by notifying a user with respect to a location of a connector interface in response to a tapping by the user.

Electronic equipment such as personal computers (PCs), video players and like electronic equipment typically operate with peripheral. Examples of peripheral components include video monitors, printers, modems, routers, power supplies, wireless cards, network connections and video input devices (hereinafter "peripheral components"), without limitation. To connect a peripheral component, various connectors are used that plug into a connector interface at some location on a housing of the electronic equipment.

Completing (i.e., "making") a connection by inserting (i.e., "plugging") a particular connector into its proper connector interface location (port or connector receptacle) on a housing panel or chassis can be a difficult task. PCs, video players and like electronic equipment can be located on a floor, under a desk or computer work station, or otherwise positioned where it is difficult for some persons to readily identify connector interface ports to receive a particular peripheral component connector. Problems in finding the location to connector interface location or port may be particularly difficult for elderly people, and people with physical disabilities or limitations. And these difficulties are compounded where the individual attempting to connect is using the electronic equipment or peripheral component for the first time.

SUMMARY OF THE INVENTION

The shortcomings identified above are in large part addressed by a system and method for notifying a user of a name and a role of a tapped interface connector location, and/or directing a user to a proper connector interface location in response to the user tapping locations a housing or chassis of the electronic equipment.

In both the system and the method embodiments, the invention responds to a person tapping on a surface or chassis of a PC, a video player or like electronic equipment to help the person find the right connection interface, i.e., connector. In a notification operating mode, the person taps at any connector interface location and the invention responds by articulating in words a name or role of the interface. As such, a person attempting access will know whether they have tapped the correct connector interface or port that is required for a particular peripheral component.

In a navigation operating mode, the person first identifies the connector interface for connection via some type of input device, which is recognized. Thereafter, the person taps the housing or chassis at one location on the electronic equipment and the invention responds by articulating or otherwise communicating a relative position of the tapping location with respect to the actual position of the specified connector interface for connection. For example, the system and method can respond to a tapping at some position on the electronic equipment with words such as close, far, hot, cold, right, left, up, down, try other side, without limitation, to help the user find the correct location of the connector interface. Alternatively, the system and method could respond by emitting a sound where the volume or frequency changes when the tapping location advances towards or away from the fixed interface location, or a light to support operation with hearing impaired persons.

The invention is useful for suitably guiding persons who may be disabled due to age or physical limitations, such as the vision-impaired. The invention is useful for guiding persons where the connector interface to the electronic equipment is located at a position that is difficult see, i.e., reachable but not visible, and for guiding beginner users of electronic equipment, for example, workers who task is to set up or install new electronic product.

In an embodiment, the invention includes a method for guiding a user to connect a peripheral component to a unit of electronic equipment by tapping. The method includes tapping upon one of a plurality of connector interfaces comprising the unit of electronic equipment, identifying the one tapped connector interface and notifying the user of the identity of the one tapped connector interface. The step of identifying can include detecting the tapping at two or more sensors and processing signals generated by the sensors to detect the one tapped connector interface. The step of notifying can include articulating an identity of the one tapped connector interface using a voice synthesizer and loudspeaker, or using a graphical user interface to display the textual description of the one tapped connector interface in a display image. The embodiment may include a computer program product comprising a tangible storage medium readable by a processor and storing instructions for execution by the processor for performing the method for guiding a user to connect to a unit of electronic equipment by tapping as set forth above.

In another embodiment, the invention includes a method for guiding a user to connect a peripheral component to a unit of electronic equipment by tapping, including a) the user identifying a connector interface required to connect the peripheral component via an input device of the electronic equipment, b) the user tapping upon a housing surface of the unit of electronic equipment, c) detecting the tapping at the housing surface, d) recognizing a region at which the housing surface has been tapped and calculating a positional relation of the taped region relative the identified connector interface for connection and e) if the recognized region is the identified connector interface for connection, notifying the user and ending the method. If the recognized region is not the identified connector interface, notifying the user of the positional relation of the tapped region relative the connector interface for connection and, based on said positional relation, repeating steps b, c, d and e.

The method includes detecting the tapping at two or more piezoelectric sensors, which generate signals comprising tapping data detected at the senor locations. The step of recognizing the region at which the housing surface has been tapped includes and calculating a positional relation of the tapped region relative the connector interface by processing the signals generated by the two or more piezoelectric sensors. The notifying the user of the positional relation includes directing the user towards the connector interface for connection by articulating a direction to move towards the connector interface using a voice synthesizer and loudspeaker, from the identified tapped region. Alternatively, the notifying the user of the positional relation includes directing the user towards the connector interface for connecting using a graphical user interface to display a textual description of a direction to move towards the connector interface using a voice synthesizer and loudspeaker.

The articulating includes articulating any of the following words and phrases; close, far, hot, cold, more left, more right, more up, more down, wrong side, right side, other surface. The embodiment may include a computer program product comprising a tangible storage medium readable by a processor and storing instructions for execution by the processor for performing the method for guiding a user to connect to a unit of electronic equipment by tapping as set forth above.

In another embodiment, the invention includes a system for guiding a user to connect to a unit of electronic equipment by tapping. The system includes a plurality of sensors for detecting vibrations generated by tapping at regions located on a chassis or housing of the unit of electronic equipment, and generating sensor signals representative of the tapping vibrations, a processor for receiving and processing the sensor signals to identify the region of the unit of electronic equipment that was tapped and a notification module that receives identity information from the processor and notifies a user whether the tapping was at a location of an connector interface for connection and, if not, a positional relation of the connector interface with respect to the tapping location.

The system further includes that the chassis or housing surface is divided into several regions (01, 02, . . . 45) that are each allocated a unique ID. The sensors are piezoelectric sensors. Four sensors are preferably arranged upon at least one flat surface of the unit of electronic equipment. The notification module generates a voice articulation that is sent to a speaker to notify the user with respect to the tapping location. The processor comprises a characteristic extraction module that receives the sensor signals, determines which signals are strongest, and knowing the location of the sensors on the electronic equipment housing, processes stronger signals to extract feature or characteristic information.

Preferably, the processor further comprises a region identification module which processes the signal information in cooperation with a list of feature definitions or characteristics that can be observed when tapping each region. The region identification module determines an ID of a region whose feature information resembles the extracted features most closely by normalizes and identifies features accumulated using a pattern recognition algorithm. The notification module receives the identification of the tapped region from the region identification part to generate a corresponding notification. User notification and navigation information may be presented on a display screen of the electronic equipment as text characters.

DESCRIPTION OF THE DRAWING FIGURES

Aspects of the invention will become apparent upon reading the following detailed description and upon reference to the accompanying drawings in which, like references may indicate similar elements:

FIG. 6 is an exemplary configuration of a structure for implementing a dictionary identifying the separate surface locations or regions such as those shown in FIG. 3A.

DETAILED DESCRIPTION OF THE INVENTION

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention, as defined by the appended claims. The descriptions below are designed to make such embodiments obvious to a person of ordinary skill in the art.

The invention is useful for suitably guiding persons to connect a peripheral component to a unit of electronic equipment who may be disabled due to age or physical limitations, vision-impaired, or where the connector interface to the electronic equipment is located at a position that is difficult see. The invention guides beginner users of electronic equipment who are not familiar with connecting peripheral components, including workers who task is to set up or install new electronic equipment or peripherals. In both the system and method embodiments, the invention responds to a person tapping on a surface or chassis of a PC, a video player or like electronic equipment to help the person identify or navigate to the proper connector interface, i.e., port.

Figure 1:
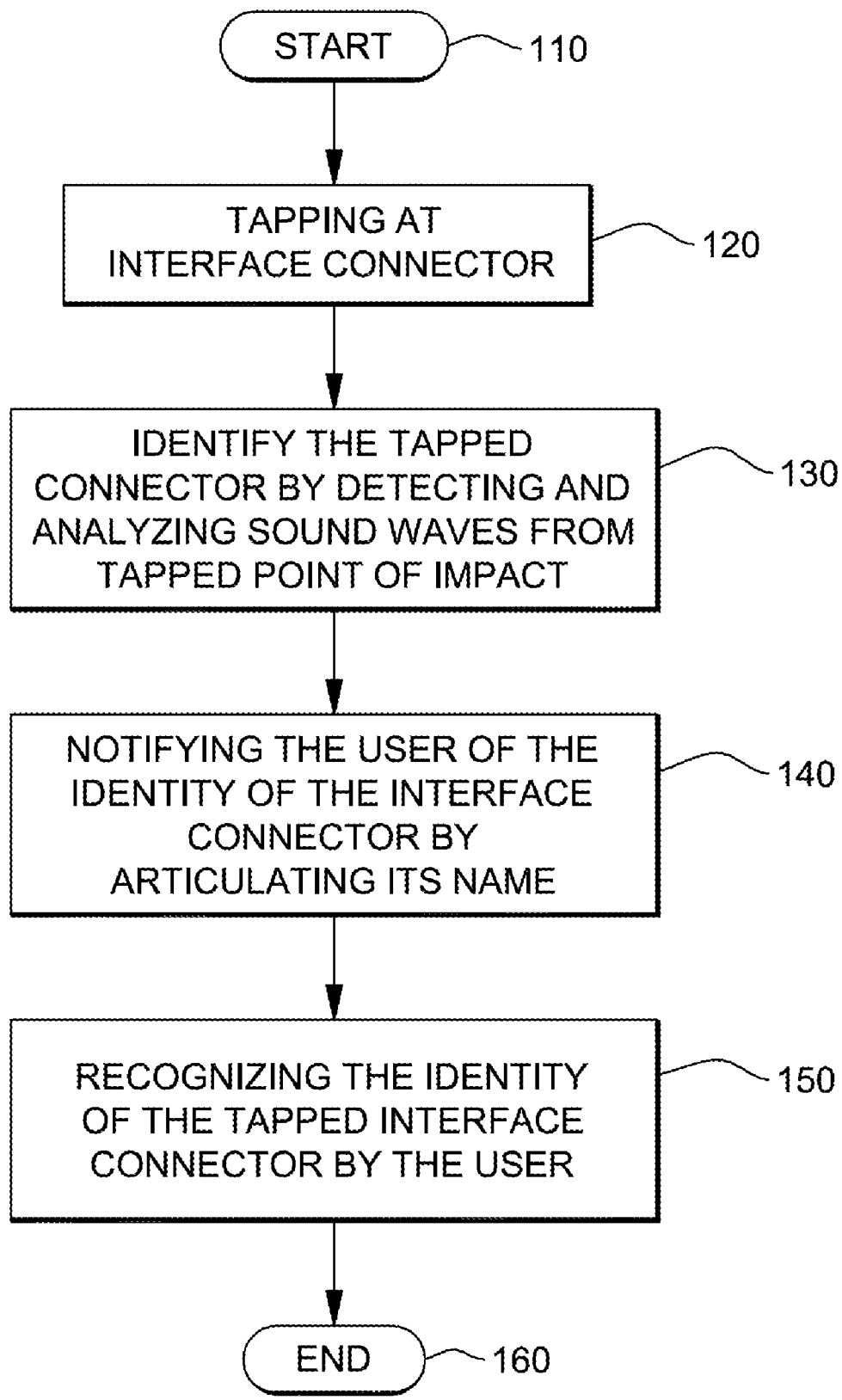
FIG. 1 is a flowchart identifying a method of inventive operation in a notification mode.

FIG. 1 depicts a method (100) for operating in a notification operating mode. Start indicator (110) represents a start or activation of a unit of electronic equipment configured to operate in accordance with the invention. In a step (120), a person wishing to connect a peripheral component taps at a connector, i.e., a connector interface, at its location on the chassis or housing of the electronic equipment. In a step (130), the method detects and identifies a location, i.e., identifies a connector interface, that is tapped by the user by detecting and analyzing a sound waves or oscillations generated by the tapping at the connector interface location on the housing/chassis.

In a step (140), the invention notifies the user of the identity of the interface connector by articulating a name of the connector interface at the tapped location. The notifying is carried out using a speaker and a voice synthesizer directed to "speak" the location after the location is first identified in step (130). Alternatively, the name of the connector interface may be presented in a display image on a display screen, in a case where the unit of electronic equipment configured for inventive operation comprises a display screen. Step (150) indicates the user recognizing the notification, i.e., whether they have tapped at the correct connector interface for the peripheral equipment to be attached. Step (160) indicates an end of the method or notification mode of operation, which can be implemented again by tapping the same or a different connector interface location.

Figure 2:
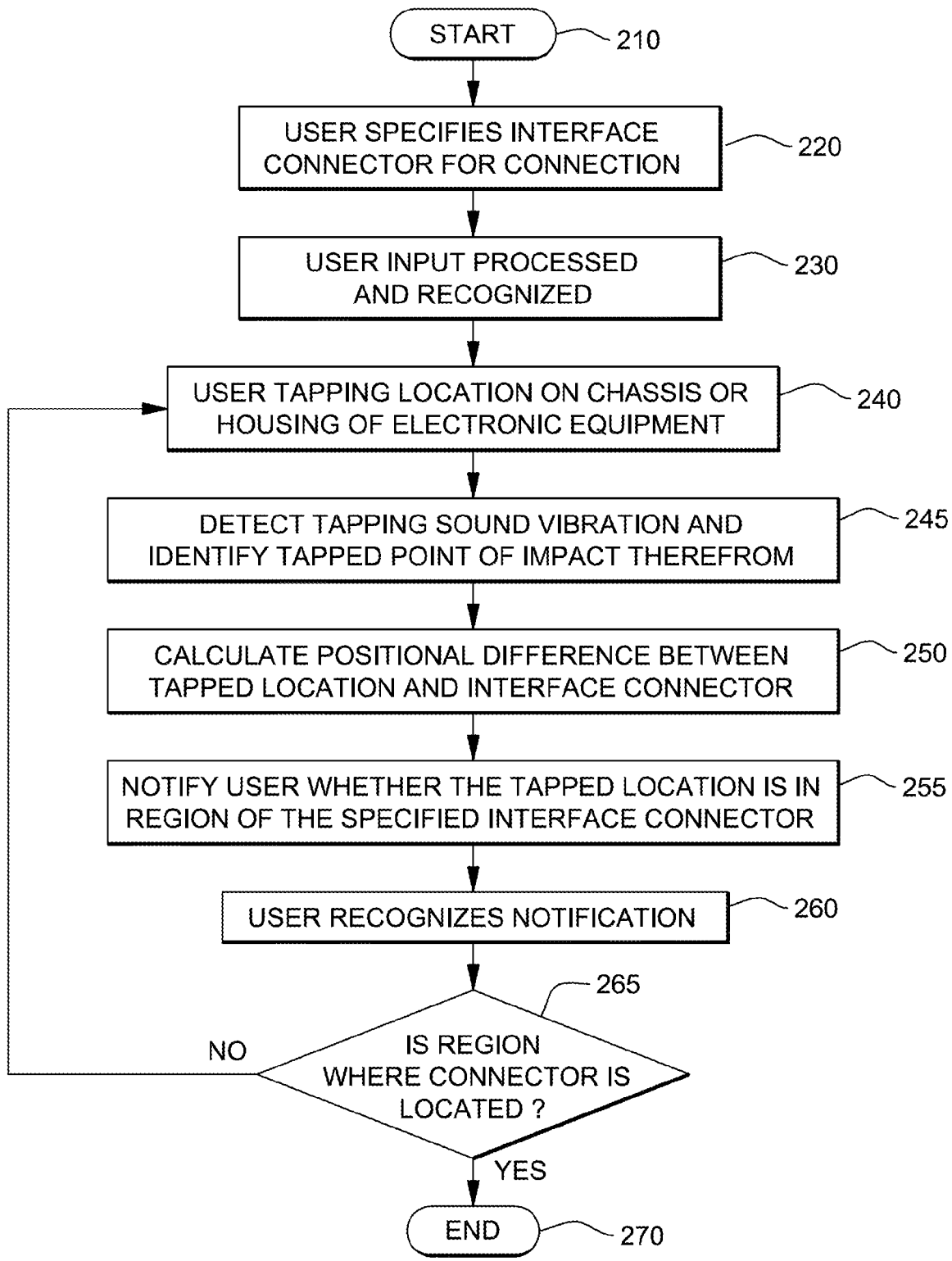
FIG. 2 is a flowchart identifying a method of inventive operation in a navigation mode.

FIG. 2 depicts a method (200) for operating in a navigation operating mode of the invention. In method (200), start indicator (210) represents a start or activation of a unit of electronic equipment configured to operate in accordance with the inventive navigation mode. In a step (220), an connector interface or object portion of the unit of electronic equipment that is desired to be reached is specified by the user. For example, where the electronic equipment includes a text or image display, after start-up, text or an interactive graphical user interface is presented to the user via the image display. The text or graphical image would present the different interfaces/connectors for the user's choice. The user chooses one. Then, in a step (230), the input is processed and recognized by the inventive process.

In a step (240), the user taps a location on the housing or chassis of the electronic equipment. In a step (245), the method detects the tapping and identifies the tapped location by analyzing a vibration or oscillation generated by the tapping. In a step (250), the method calculates a difference between the tapped location and the location of the connector interface for connection. In a step (255), the method notifies the user whether the tapped location is in a region of the specified connector interface. To do so, the navigation mode drives a speaker fed by a voice synthesizer to articulate instructions so that the user can recognize a region at which they have tapped in relation to the location of the desired connector interface (e.g., close, far, hot, cold, more left, more right, more up, more down, wrong side, right side, etc.). Alternatively, some kind of relational indication may be presented in a display image on a display screen, in a case where the unit of electronic equipment configured for inventive operation comprises a display screen.

A step (260) indicates that the user recognizes the notification, i.e., whether they have reached the object point or not. Decision diamond (265) indicates where the process receives an input from the user indicating that the user has or has not reached the object point, the intended connector interface. If Yes, the navigation mode process flow continues to step (270), the process end. If No, the object point has not been reached; the user taps the chassis or housing again, as indicated by the arrow looping back to/at step (240). Thereafter, steps (245), (250), (255), (260) and (265) are again repeated. In the case where the user recognizes that they have found the object point in step (260), the process may recognize that decision step (265) results in No by plugging into the connector interface, or by providing some kind of user input.

Figure 3A:
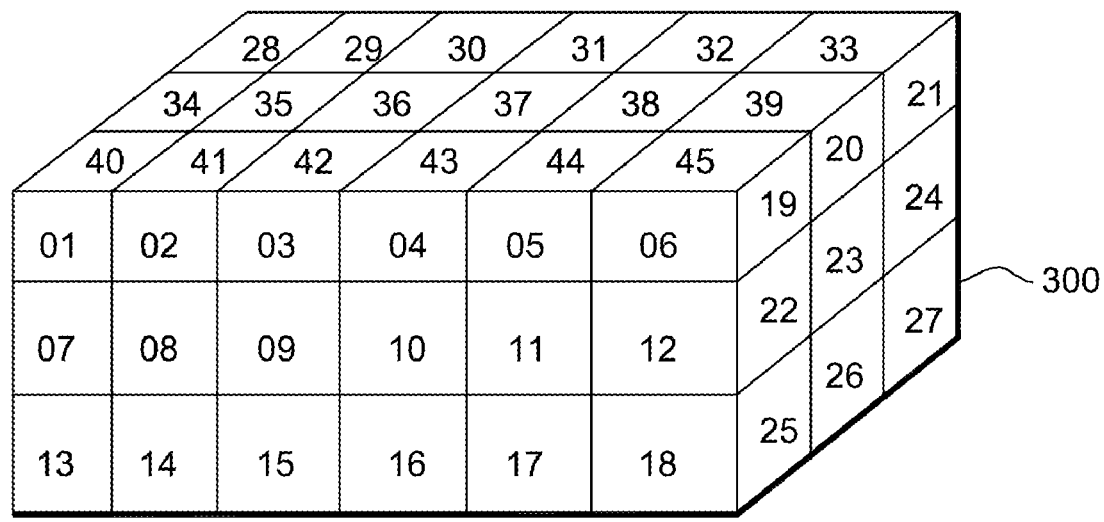
FIG. 3A is a three-dimensional diagrammatic representation of a unit of electronic equipment in which the surfaces are separated into regions.

FIG. 3A shows one way of dividing the six (6) surfaces of a cubic or rectangular electronic equipment (300) configured to operate in accordance with the invention, i.e., its housing or chassis, into several regions (01, 02, . . . 45). Each of the several regions is allocated a unique region ID so that the tapped location (i.e., region) can be identified in the context of the delineated regions. In certain inventive implementations, less than six (6) rectangular or cubic surfaces may be active, for example, in a case where the electronic equipment is so weighty that one would not think to lift and tap on the bottom to find a connector interface. In the FIG. 3A embodiment, the housing or chassis is uniformly divided so that each region has the same area. However, it is allowable to appropriately finely divide portions where the shape of the housing or chassis is complicated and portions where interfaces (connectors) are closely spaced, with deviating from the invention.

Figure 3B:
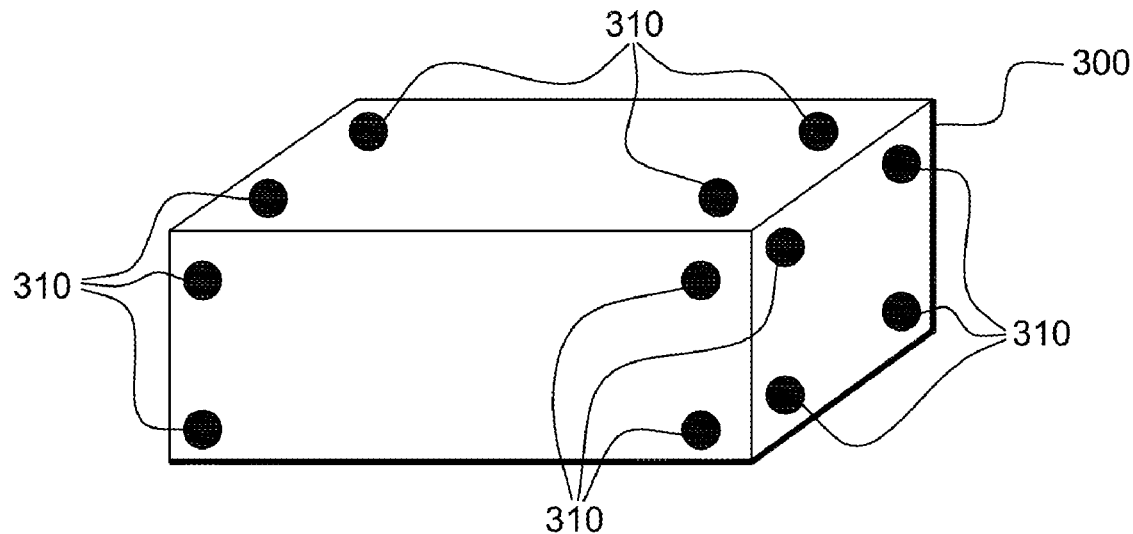
FIG. 3B is a three-dimensional diagrammatic representation of a unit electronic equipment in which four piezoelectric elements are located at each unit surface shown.

Sensors (310), such as piezoelectric elements, are installed on the housing or chassis surface of the unit of electronic equipment (300) so that a location of oscillations generated by tapping in a region can be identified. FIG. 3B depicts an exemplary arrangement of sensors (310) fixed at four corners of each face or housing surface comprising the electronic equipment (300). The FIG. 3B sensor arrangement may be modified, however, and/or additional sensors added or removed without deviating from the scope and spirit of the invention. The sensors are preferably mounted on an inside of the electronic equipment housing.

Figure 4:
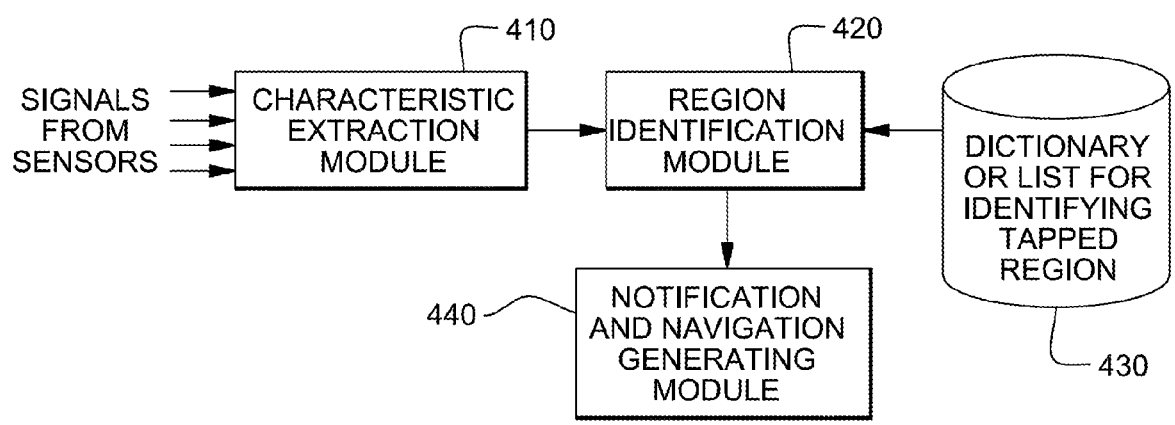
FIG. 4 is a schematic block representation of system components that cooperate with sensors to implement the invention.

FIG. 4 herein is a functional block diagram depicting system components (400) that cooperate with sensors (310) for implementing the invention. A characteristic feature extraction module (410) receives the signals detected by the piezoelectric elements (310). The characteristic feature extraction module determines which signals are strongest, and knowing their location on the electronic equipment housing or chassis, processes stronger signals to extract feature or characteristic information. The characteristic extraction module (410) provides the signal information to a region extraction module (420), which processes the signal information in cooperation with a dictionary for identifying regions (430), i.e., regions such as 01, 02, . . . 45. The dictionary for identifying regions (430) stores the feature definitions or characteristics that might be observed when tapping each region.

The region identification module (420) determines an ID of a region whose feature information resembles the extracted features most closely. The identifying (i.e., region identification) is performed using a method of normalization and identification of features accumulated using some type of pattern recognition algorithm. For example, by processing a set of feature values as a multi-dimensional vector, the region identification module uses the vector to calculate a Euclidean distance from a sensor to the tapped region. The processing requires using the feature information for each region in the dictionary to determine the tapped region.

A notification/navigation generation module (440) receives the identification of the tapped region from the region identification module to generate a corresponding notification ("It is a connector of so-and-so") and navigation ("The connector of so-and-so is a little to the left."). Notification and navigation information may be shown on a display screen of the electronic equipment as text characters if a display screen is included in the electronic equipment, as well as communicated by generated voice signals. For that matter, a sound notification for the notification mode may be an audio signal that increases and decreases in volume with respect to proximity of an intended connector (interface) to the tapping.

Figure 5:
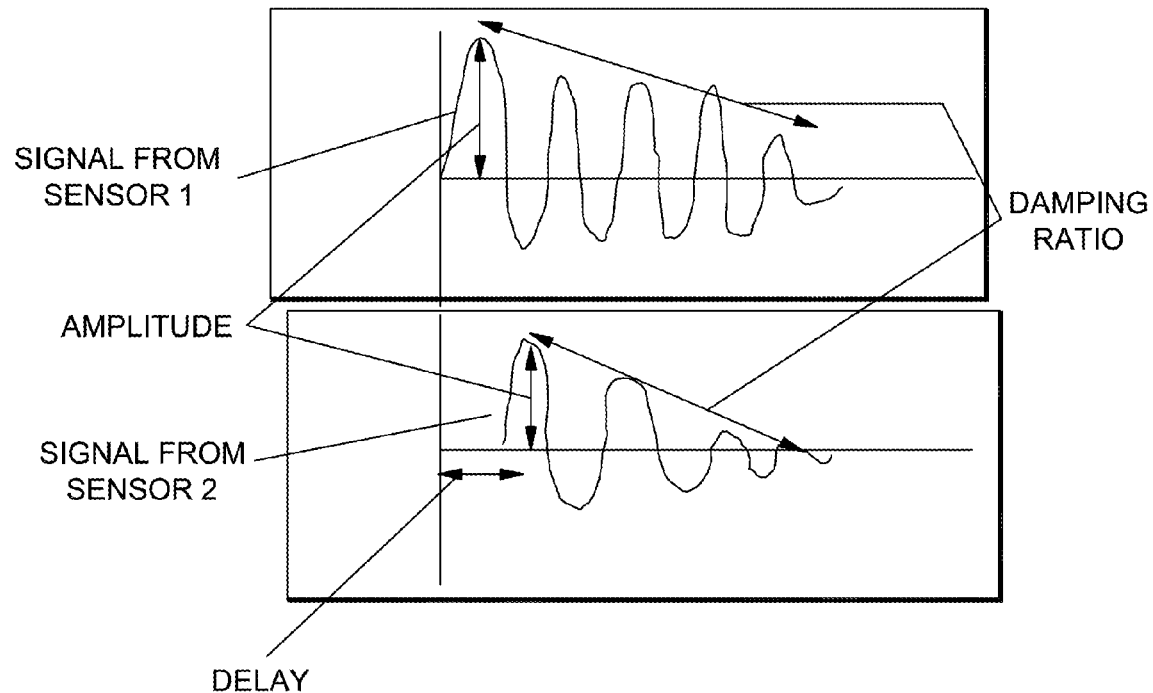
FIG. 5 is a graphical representation of signals detected in response to tapping by two sensors, which signals are processed by the system components of FIG. 4.
Figure 7:
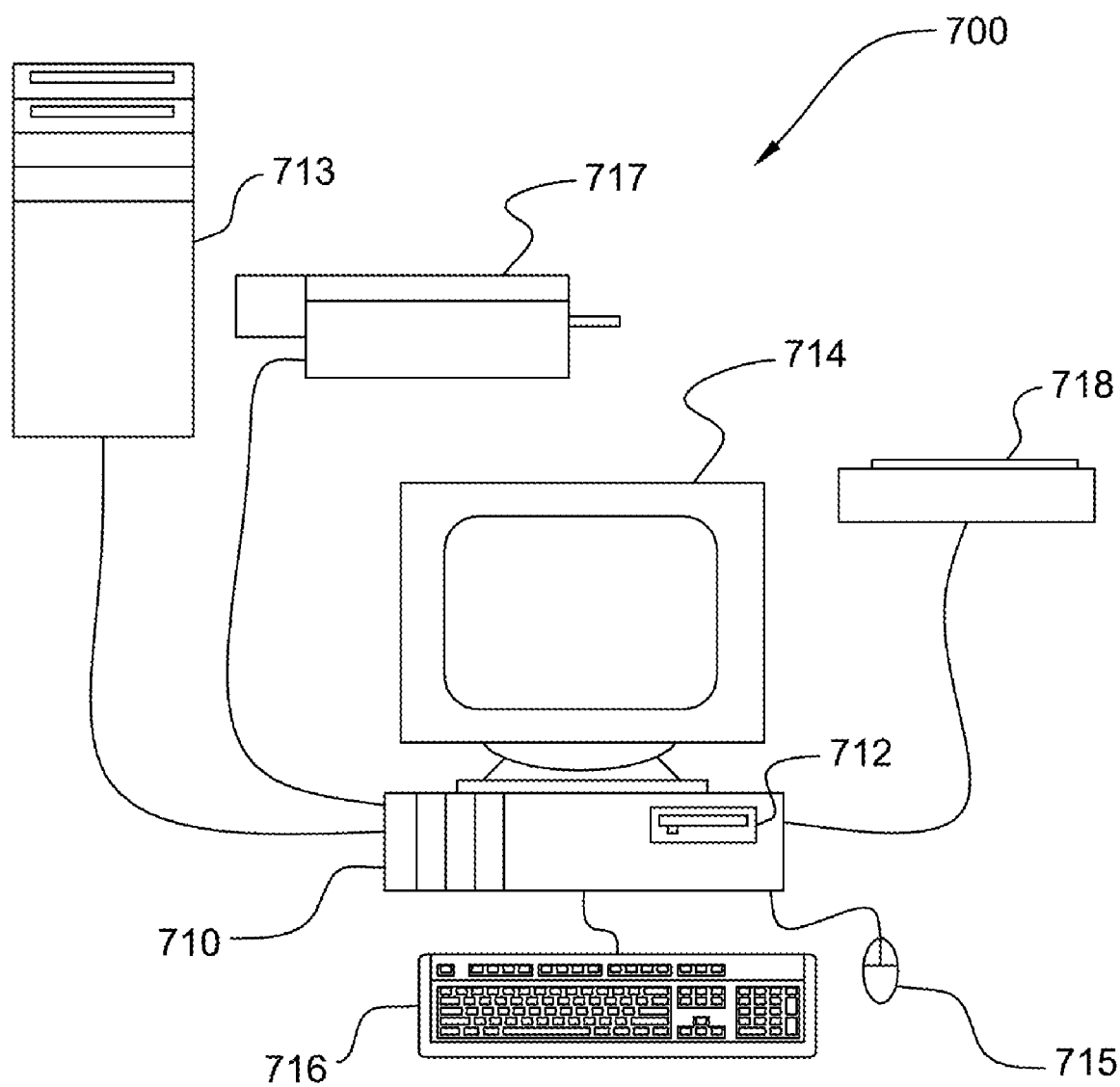
FIG. 7 is a depiction of a general purpose computer system within which the invention can be implemented.

FIG. 5 shows an example of signals received at two piezoelectric sensors (310), identified as sensors (1) and (2), which are positioned at different locations on the electronic equipment (300). Sensor (1) is a sensor that detects tapping first in this example, i.e., is closest to the tapped region. The sensor (1) signal as shown represents the received signal. The signal from sensor (2) comprises an amplitude, damping ratio (rate) and time delay (lag) with respect to the signal from the closer sensor (1). These signals can be processed using conventional signal analysis, for example, frequency analysis by Fourier transformation, within the characteristic extraction module (410).

FIG. 6 depicts one embodiment of an internal structure of a dictionary for identifying regions (430) shown in FIG. 4, wherein the dictionary is depicted as a two-dimensional table or list. The internal dictionary structure shown, however, is shown for exemplary purposes only, and may be modified without deviating from the scope and spirit of the invention. In a first column at the left, the region IDs are presented in each row (1, 2, 3, 4, 5, . . . ). Along the top, each sensor is identified moving left to right in the uppermost row, for example, sensor 1, sensor 2, sensor 3, to identify expected characteristic values at the sensor where a tapping occurs at an identified region. In the second row, and corresponding to each sensor column, an amplitude value, a damping factor value, a delay value, etc. are identified for each sensor. While only three characteristic values are identified, other values may be included to better identify what is expected to be detected at a sensor when a particular region is tapped, to better support the region identification module (420).

The various method embodiments of the invention will be generally implemented by a computer executing a sequence of program instructions for carrying out the steps of the method, assuming all required data for processing is accessible to the computer. The sequence of program instructions may be embodied in a computer program product comprising media storing the program instructions.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the method, and variations on the method as described herein. Alternatively, a specific use computer, containing specialized hardware for carrying out one or more of the functional tasks of the invention, could be utilized.

A computer-based system (700) is depicted in FIG. 8 herein, by which the inventive method for controlling test program operation in a multithread environment that starts all resource sharing and non-atomic updating program copies in a test pool without test program hang or deadlocks on shared resources, described in detail with respect to FIGS. 2, 3, 5 and 6 may be carried out. The computer-based system (700) includes a processing unit (710), which houses a processor or processing circuit, memory and other systems components (not shown expressly in the drawing figure) that implement a general purpose processing system, or computer that may execute a computer program product. The computer program product may comprise media, for example a compact storage medium such as a compact disc, which may be read by the processing unit (710) through a disc drive (720), or by any means known to the skilled artisan for providing the computer program product to the general purpose processing system for execution thereby.

The computer program product comprises all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit (710), as mentioned, or may be located on a remote system such as a server (730), coupled to processing unit (710), via a network interface such as an Ethernet interface. Monitor (740), mouse (750) and keyboard (760) are coupled to the processing unit (710), to provide user interaction. Scanner (780) and printer (770) are provided for document input and output. Printer (770) is shown coupled to the processing unit (710) via a network connection, but may be coupled directly to the processing unit. Scanner (780) is shown coupled to the processing unit (710) directly, but it should be understood that peripherals might be network coupled, or direct coupled without affecting the ability of the processing unit (710) to perform the method of the invention.

Although examples of the present invention have been shown and described, it would be appreciated by those skilled in the art that changes may be made in these embodiments without departing from the principles and spirit of the invention, the scope of which is defined in the claims and their equivalents. For example, while the program of the present system is illustratively described as a test program, clearly any application program would readily benefit from the present system and as such, the present system should be understood to apply to any application program and pools of application programs.

What is claimed is:

1. A method for guiding a user to connect a peripheral component to a unit of electronic equipment by tapping, said method comprising steps of:
   a) the user identifying a connector interface required to connect the peripheral component via an input device of the electronic equipment;
   b) the user tapping upon a housing surface of the unit of electronic equipment;
   c) detecting the tapping at the housing surface;
   d) recognizing a region at which the housing surface has been tapped and calculating a positional relation of the tapped region relative to the identified connector interface for connection; and
   e) if the recognized region is the identified connector interface for connection, notifying the user and ending the method,
   otherwise, notifying the user of the positional relation of the tapped region relative the connector interface for connection and, based on said positional relation, repeating steps b, c, d and e.

2. The method of claim 1, wherein the step of detecting includes detecting the tapping at two or more piezoelectric sensors, which generate signals comprising tapping data detected at the sensor locations.

3. The method of claim 2, wherein the step of recognizing the region at which the housing surface has been tapped includes calculating a positional relation of the tapped region relative the connector interface by processing the signals generated by the two or more piezoelectric sensors.

4. The method of claim 1, wherein the region that is recognized from an initial performance of step d is not the identified connector interface for connection.

5. A method for guiding a user to connect a peripheral component to a unit of electronic equipment by tapping, said method comprising steps of:
   a) the user identifying a connector interface required to connect the peripheral component via an input device of the electronic equipment;
   b) the user tapping upon a housing surface of the unit of electronic equipment;
   c) detecting the tapping at the housing surface;
   d) recognizing a region at which the housing surface has been tapped and calculating a positional relation of the tapped region relative the identified connector interface for connection; and
   e) if the recognized region is the identified connector interface for connection, notifying the user and ending the method,
   otherwise, notifying the user of the positional relation of the tapped region relative the connector interface for connection and, based on said positional relation, repeating steps b, c, d and e,
   wherein the region that is recognized from an initial performance of step d is not the identified connector interface for connection;
   wherein the notifying the user of the positional relation includes directing the user towards the connector interface for connection by either:
      (i) articulating a direction to move towards the connector interface using a voice synthesizer and loudspeaker, from the identified tapped region; or
      (ii) using a graphical user interface to display a textual description of said direction to move towards the connector interface using said voice synthesizer and loudspeaker.

6. The method of claim 5, wherein the notifying the user of the positional relation includes directing the user towards the connector interface for connection by said articulating a direction to move towards the connector interface using a voice synthesizer and loudspeaker, from the identified tapped region.

7. The method of claim 5, wherein the notifying the user of the positional relation includes directing the user towards the connector interface for connection by said using a graphical user interface to display a textual description of a direction to move towards the connector interface using a voice synthesizer and loudspeaker.

8. A computer program product, comprising a computer readable physically tangible storage device having computer readable program code stored therein, said program code configured to be executed by a processor of a computer system to implement a method for guiding a user to connect to a unit of electronic equipment by tapping, said method comprising steps of:
  a) the user identifying a connector interface required to connect the peripheral component via an input device of the electronic equipment;
  b) the user tapping upon a housing surface of the unit of electronic equipment;
  c) detecting the tapping at the housing surface;
  d) recognizing a region at which the housing surface has been tapped and calculating a positional relation of the tapped region relative to the identified connector interface for connection; and
  e) if the recognized region is the identified connector interface for connection, notifying the user and ending the method,
  otherwise, notifying the user of the positional relation of the tapped region relative the connector interface for connection and, based on said positional relation, repeating steps b, c, d and e.

9. The computer program product of claim 8, wherein the region that is recognized from an initial performance of step d is not the identified connector interface for connection.

10. The computer program product of claim 9, wherein the notifying the user of the positional relation includes directing the user towards the connector interface for connection by either:
  (i) articulating a direction to move towards the connector interface using a voice synthesizer and loudspeaker, from the identified tapped region; or
  (ii) using a graphical user interface to display a textual description of said direction to move towards the connector interface using said voice synthesizer and loudspeaker.

11. The computer program product of claim 10, wherein the notifying the user of the positional relation includes directing the user towards the connector interface for connection by said articulating a direction to move towards the connector interface using a voice synthesizer and loudspeaker, from the identified tapped region.

12. The computer program product of claim 10, wherein the notifying the user of the positional relation includes directing the user towards the connector interface for connection by said using a graphical user interface to display a textual description of a direction to move towards the connector interface using a voice synthesizer and loudspeaker.

13. The computer program product of claim 8, wherein the step of detecting includes detecting the tapping at two or more piezoelectric sensors, which generate signals comprising tapping data detected at the sensor locations.

14. The computer program product of claim 13, wherein the step of recognizing the region at which the housing surface has been tapped includes calculating a positional relation of the tapped region relative the connector interface by processing the signals generated by the two or more piezoelectric sensors.

15. A computer system comprising a processor and a computer readable storage device coupled to the processor, said storage device containing program code configured to be executed by the processor to implement a method for guiding a user to connect to a unit of electronic equipment by tapping, said method comprising steps of:
  a) the user identifying a connector interface required to connect the peripheral component via an input device of the electronic equipment;
  b) the user tapping upon a housing surface of the unit of electronic equipment;
  c) detecting the tapping at the housing surface;
  d) recognizing a region at which the housing surface has been tapped and calculating a positional relation of the tapped region relative to the identified connector interface for connection; and
  e) if the recognized region is the identified connector interface for connection, notifying the user and ending the method,
  otherwise, notifying the user of the positional relation of the tapped region relative the connector interface for connection and, based on said positional relation, repeating steps b, c, d and e.

16. The computer program product of claim 15, wherein the region that is recognized from an initial performance of step d is not the identified connector interface for connection.

17. The computer program product of claim 16, wherein the notifying the user of the positional relation includes directing the user towards the connector interface for connection by either:
  (i) articulating a direction to move towards the connector interface using a voice synthesizer and loudspeaker, from the identified tapped region; or
  (ii) using a graphical user interface to display a textual description of said direction to move towards the connector interface using said voice synthesizer and loudspeaker.

18. The computer program product of claim 17, wherein the notifying the user of the positional relation includes directing the user towards the connector interface for connection by said articulating a direction to move towards the connector interface using a voice synthesizer and loudspeaker, from the identified tapped region.

19. The computer program product of claim 17, wherein the notifying the user of the positional relation includes directing the user towards the connector interface for connection by said using a graphical user interface to display a textual description of a direction to move towards the connector interface using a voice synthesizer and loudspeaker.

20. The computer program product of claim 15, wherein the step of detecting includes detecting the tapping at two or more piezoelectric sensors, which generate signals comprising tapping data detected at the sensor locations.

21. The computer program product of claim 20, wherein the step of recognizing the region at which the housing surface has been tapped includes calculating a positional relation of the tapped region relative the connector interface by processing the signals generated by the two or more piezoelectric sensors.

* * * * *